US008233259B2

(12) United States Patent
Lee et al.

(10) Patent No.: US 8,233,259 B2
(45) Date of Patent: Jul. 31, 2012

(54) REFORMED INDUCTOR, A SURGE PROTECTION DEVICE AND A SURGE PROTECTOR

(75) Inventors: Yu-Lung Lee, Nanjhuang Township, Miaoli County (TW); Tsong-Hwa Chen, Chung Ho (TW); Bor-Hua Hsu, Tucheng (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 311 days.

(21) Appl. No.: 12/458,120

(22) Filed: Jul. 1, 2009

(65) Prior Publication Data

US 2010/0165530 A1 Jul. 1, 2010

(30) Foreign Application Priority Data

Dec. 31, 2008 (TW) ............................... 97151569 A

(51) Int. Cl.
*H02H 3/20* (2006.01)

(52) U.S. Cl. ....................................................... 361/118

(58) Field of Classification Search .................... 361/54, 361/111, 118, 120, 127; 315/119
See application file for complete search history.

(56) References Cited

U.S. PATENT DOCUMENTS

| | | | | |
|---|---|---|---|---|
| 4,587,588 | A * | 5/1986 | Goldstein | 361/54 |
| 4,901,183 | A * | 2/1990 | Lee | 361/56 |
| 5,488,534 | A * | 1/1996 | Rau et al. | 361/56 |
| 6,188,557 | B1 * | 2/2001 | Chaudhry | 361/111 |
| 7,167,073 | B2 * | 1/2007 | Hatano | 336/200 |
| 2007/0109089 | A1 * | 5/2007 | Flanders et al. | 336/220 |
| 2010/0127625 | A1 * | 5/2010 | Minarczyk et al. | 315/119 |

FOREIGN PATENT DOCUMENTS

CN 201122484 9/2008

* cited by examiner

*Primary Examiner* — Rexford Barnie
*Assistant Examiner* — Angela Brooks
(74) *Attorney, Agent, or Firm* — Rosenberg, Klein & Lee

(57) ABSTRACT

A reformed inductor, a surge protection device, and a surge protector with the reformed inductor and the surge protection device are disclosed. The surge protector includes a main body, a power plug, at least a socket, and a power protection device; wherein the power protection device include a reformed inductor, a plurality of fuses, and a plurality of surge absorber. The design of the surge protector can be used to reduce surge and stabilize current by connecting with circuit of the power outlet.

4 Claims, 3 Drawing Sheets

REFORMED INDUCTOR, A SURGE PROTECTION DEVICE AND A SURGE PROTECTOR

BACKGROUND OF THE INVENTION

1. Field of the Invention

The present invention relates to a surge protection device that utilizes a reformed inductor, and a surge protector that utilizes the surge protection device; in particular, to a surge protection device with a reformed inductor, whose primary purpose is to prevent power surge and to stabilize current.

2. Description of Related Art

A common surge protector today, in order to eliminate electromagnetic interference (EMI) between wires of household appliances and other electrical components, tends to add a set of chock coil at the power input end, so as to filter the noise within the current and to stabilize the current within the appliances and the components, thereby ensure stable power quality thereof. However most surge protector of the current market tends to simply add an inductor respectively to the hot line and neutral line, which necessarily leads to increased wiring and cost so as to accommodate the two inductors, thereby making it difficult to simplify circuit and reduce cost, and result in difficulty for product miniaturization due to the extra components and wires.

SUMMARY OF THE INVENTION

In order to resolve the technical limitation of the prior art, the present invention provides a reformed inductor, a surge protection device that utilizes the reformed inductor, and a surge protector with the surge protection device. This surge protector with the surge protection device that utilizes the reformed inductor may simplify circuit, reduce cost, enable product miniaturization, and furthermore prevent power surge and stabilize current.

The reformed inductor according to an embodiment of the present invention includes: an induction element; a first coil winding, the first coil winding connecting to one end of the induction element, and the first coil winding has a first terminal conduction end and a second terminal conduction end; and a second coil winding, the second coil winding connecting to the other end of the induction element opposite to the first coil winding, and the second coil winding has a first terminal conduction end and a second terminal conduction end.

A power protection device that utilizes the reformed inductor, and a surge protector with the power protection device is provided according to an embodiment of the present invention, wherein the surge protector includes: a main body; a power plug connecting to the main body; at least a socket, installed within the main body and electrically connected to the power plug; and a power protection device, for preventing power surge and stabilizing current. Therein the power protection device includes: a reformed inductor that includes an induction element, a first coil winding, and a second coil winding, the two coil winding respectively coils around the two ends of the induction element; a first fuse, one end of the first fuse is connected to the first terminal conduction end of the first coil winding and a hot line of the wires; a second fuse, one end of the second fuse is connected to the second terminal conduction end of the first coil winding and the hot line of the wires; a first surge absorber, one end of the first surge absorber is connected to one the other end of the first fuse, the other end of the first surge absorber is connected to the first terminal conduction end of the second coil winding and a neutral line of the wires; a second surge absorber, one end of the second surge absorber is connected to one the other end of the second fuse, the other end of the second surge absorber is connected to the second terminal conduction end of the second coil winding and the neutral line of the wires; a third fuse, one end of the third fuse is connected to a neutral line of the wires; a third surge absorber, one end of the third surge absorber is connected to the other end of the third fuse, the other end of the third surge absorber is connected to the first terminal conduction end of the second coil winding and the neutral line of the wires; a fourth surge absorber, one end of the fourth surge absorber is connected to the other end of the first fuse, the other end of the fourth surge absorber is connected to the other end of the third fuse; a fourth fuse, one end of the fourth fuse is connected to the neutral line of the wires; a fifth surge absorber, one end of the fifth surge absorber is connected to the other end of the fourth fuse, the other end of the fifth surge absorber is connected to the second terminal conduction end of the second coil winding and the neutral line of the wires; and a sixth surge absorber, one end of the sixth surge absorber is connected to the other end of the second fuse, the other end of the sixth surge absorber is connected to the other end of the fourth fuse.

According to the power protection device that utilizes the reformed inductor and the surge protector with the power protection device provided by the present invention, the two inductors within the power protection device may be replaced with simply one inductor, thereby the circuit is simplified and the cost is reduced.

DETAILED DESCRIPTION OF THE PREFERRED EMBODIMENTS

A power protection device that utilizes a reformed inductor, and a surge protector with the power protection device is provided according to an embodiment of the present invention, wherein the surge protector includes: a main body, a power plug connecting to the main body; at least a socket, installed within the main body and electrically connected to the power plug; and a power protection device. Therein the power protection device includes: a reformed inductor, a plurality of fuses, and a plurality of surge absorbers. The aforementioned illustrations and following detailed descriptions are exemplary for the purpose of further explaining the scope of the present invention. Other objectives and advantages related to the present invention will be illustrated in the subsequent descriptions and appended drawings.

Figure 1:
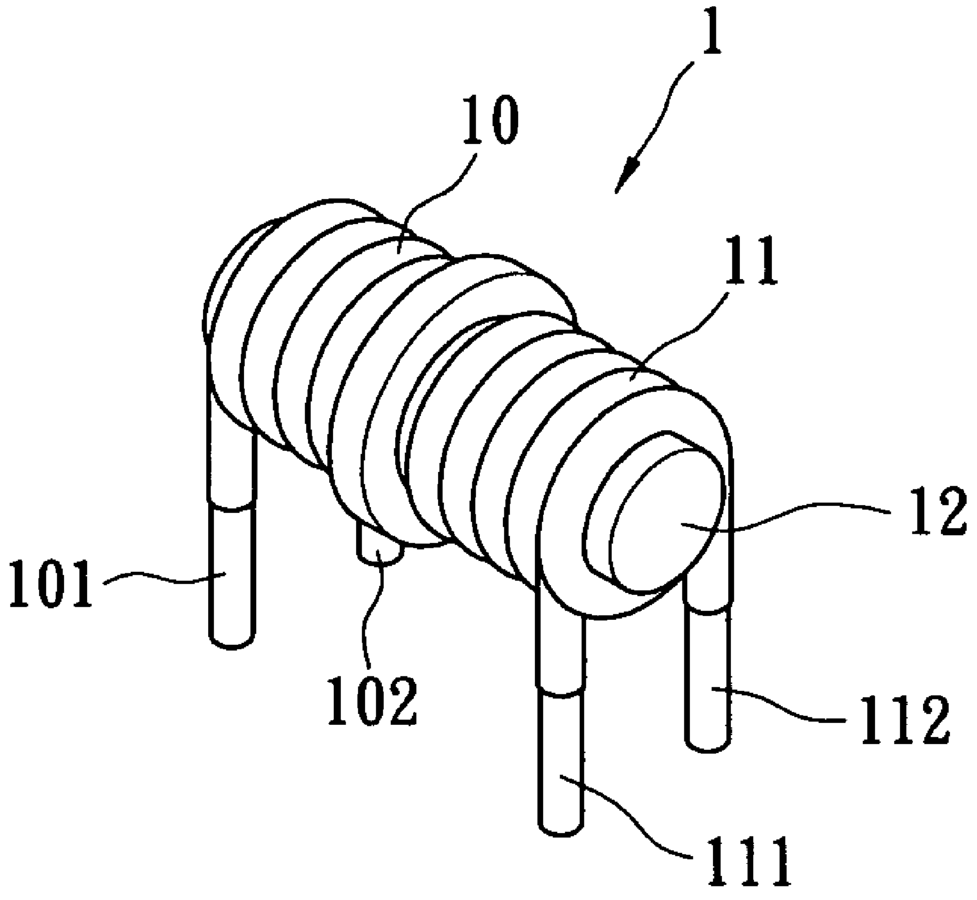
FIG. 1 shows a schematic diagram of a reformed inductor according to an embodiment of the present invention.

Refer to FIG. 1, the reformed inductor 1 according to the present invention includes: a first coil winding 10, a second coil winding 11, and an induction element. The first coil winding 10 and the second coil winding 11 respectively utilizes a metallic wire with insulation layer covered on the surface of the wire, and this metallic wire with insulated layer are wrapped into a coil according to a specific way. Therein, the coiled metallic wires by coiling in layers forms the two coil windings, which may be coiled with a circular shape or a square shape. The two ends of the coiled metallic wires is respectively a first terminal conduction end 101 and a second terminal conduction end 102 of the first coil winding 10, and a first terminal conduction end 111 and a second terminal conduction end 112 of the second coil winding 11. Therein these terminal conduction ends are for electrically connecting to wires that connects to power. The aforementioned metallic wires may be any metal that generates electromagnetic effect, such as gold, silver, copper, or iron. The induction element 12 is for inducing magnetic field for the inductor, and the shape of the induction element 12 is a ring, hollow-square, or cylindrical. Therein, one end of the induction element 12 is coiled (i.e. connected) with the first coil winding 10, and the other end of the induction element 12 is coiled (i.e. connected) with the second coil winding 11. Therein the coil number of the first coil winding 10 and the coil number of the second winding 11 may be the same or different.

Figure 2:
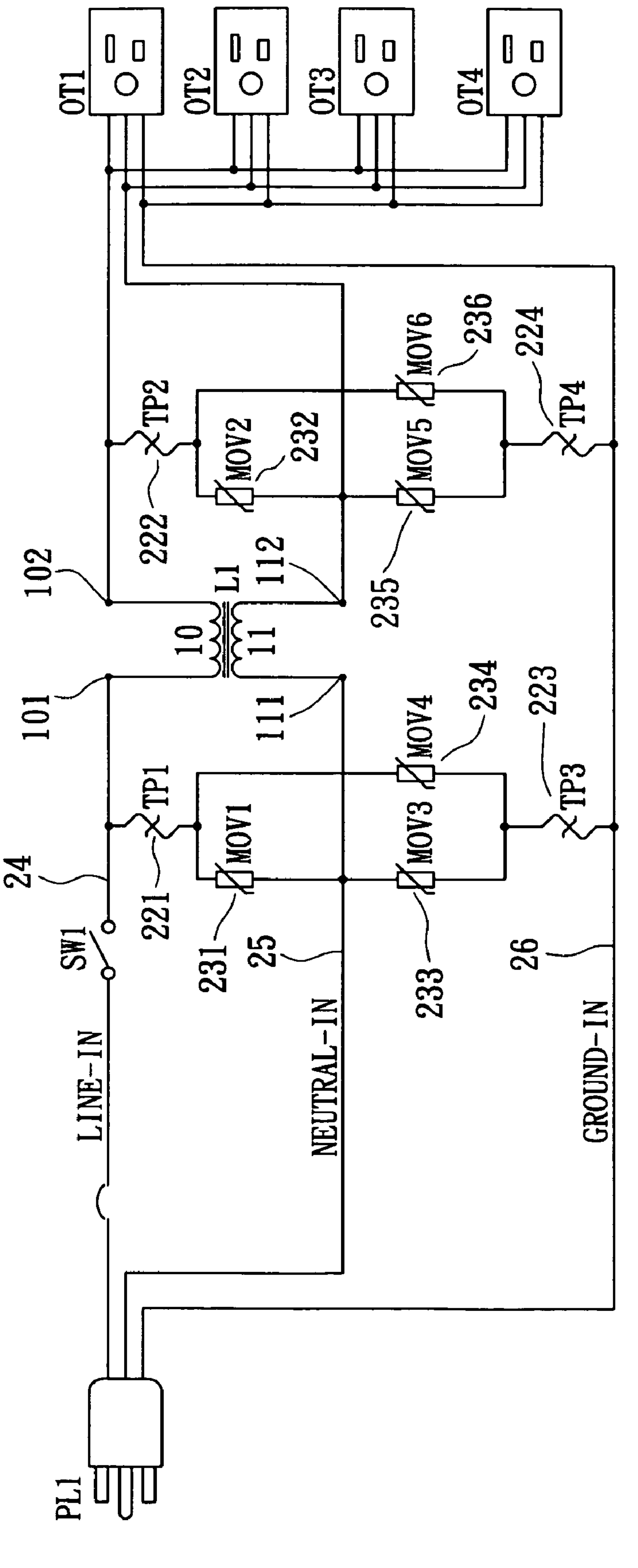
FIG. 2 shows a schematic diagram displaying a power protection device of a surge protector according to an embodiment of the present invention.

FIG. 2 shows a schematic diagram displaying a power protection device of a surge protector, the power protection device includes: a reformed inductor 1 with a first coil winding 10 and a second coil winding 11; a first fuse 221; a second fuse 222; a third fuse 223; a forth fuse 224; a first surge absorber 231; a second surge absorber 232; a third surge absorber 233; a fourth surge absorber 234; a fifth surge absorber 235; and a sixth surge absorber 236. Therein the surge absorbers are a metal oxide varistors (MOV) or transient/surge absorbers, for preventing the occurrence of power surge.

The power protection device is for being installed with wires connecting to power, which includes: the first coil winding 10 of the aforementioned reformed inductor 1 being serially connected with the hot line 24, wherein the first terminal conduction end 101 of the first coil winding 10 is thereby electrically connected to the wires near the side of power supply side (i.e. PL1) and the second terminal conduction end 102 of the first coil winding 10 is electrically connected to the wires near the load end; the second coil winding 11 of the reformed inductor 1 is serially connected with the neutral line 25, wherein the first terminal conduction end 111 is electrically connected to the wires near the power supply side, and the second terminal conduction end 112 of the second coil winding 11 is electrically connected to the wires near the load end. One end of the aforementioned first fuse 221 is connected to the hot line 24 of the wires near the power supply side, and the other end of the first fuse 221 is connected to one end of the aforementioned first surge absorber 231, furthermore the other end of the first surge absorber 231 is connected to the neutral line 25 of the wires near the power supply side; one end of the second fuse 222 is connected to the hot line 24 of the wires near the load end, and the other end of the second fuse 222 is connected to one end of the aforementioned second surge absorber 232, furthermore the other end of the second surge absorber 232 is connected to the neutral line 25 of the wires near the load end; one end of the third fuse 223 is connected to the neutral line 26 of the wires, and the other end of the third fuse 223 is connected to one end of the aforementioned third surge absorber 233, furthermore the other end of the third surge absorber 233 is connected to the neutral line 25 of the wires near the power supply end; one end of the fourth fuse 224 is connected to the neutral line 26 of the wires, and the other end of the fourth fuse 224 is connected to one end of the aforementioned fifth surge absorber 235, furthermore the other end of the fifth surge absorber 235 is connected to the neutral line 25 of the wires near the load end; one end of the fourth surge absorber 234 is connected with the first fuse 221 and the first surge absorber 231; one end of the sixth surge absorber 236 is connected with the second fuse 222 and the second surge absorber 232.

Figure 3:
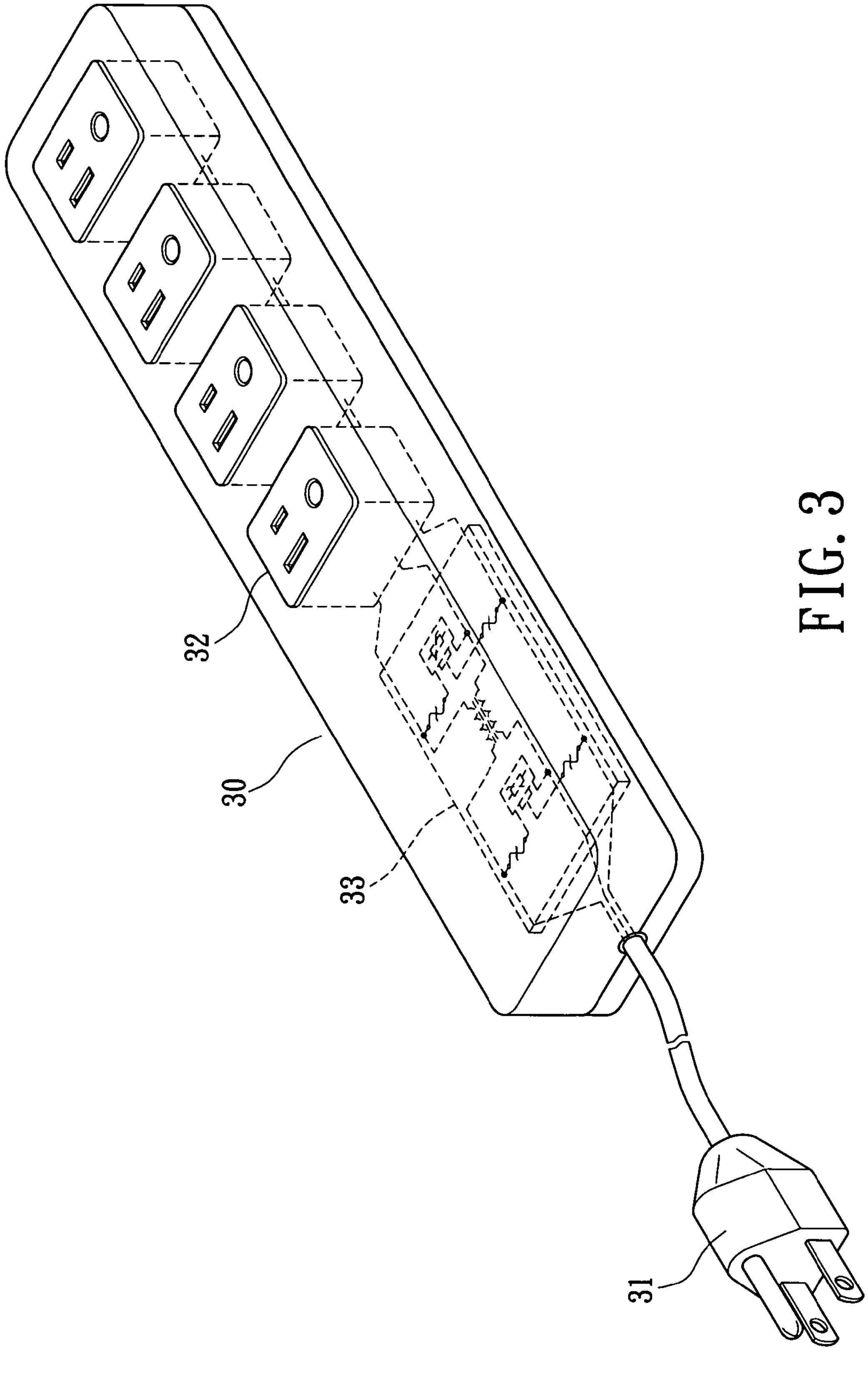
FIG. 3 shows a schematic diagram of a surge protector with the power protection device according to an embodiment of the present invention.

FIG. 3 shows a schematic diagram of a surge protector with the power protection device according to an embodiment of the present invention, the surge protector includes: a main body 30, a power plug 31, at least one socket 32 electrically connected to the power plug 31, and the aforementioned power protection device 33 installed within the main body 30 and coupled between the power plug 31 and the socket 32, so as to prevent power surge and to stabilize current.

When currents respectively flow through two neighboring inductors, the inductance of the inductors not only includes self inductance generated from currents flowing through each inductor's coil, but also includes mutual inductance. Therein, when one of the two neighboring inductors experiences electric potential change upon its coil, then the other inductor's coil may also experience changes, and this is the aforementioned mutual inductance. Because the coil winding structure according to the present invention, when the current flows through the two coil windings of the reformed inductor 1, self inductance and mutual inductance is generated simultaneously, so that the require number of coil winding loop from a single inductor is less than the number of coil winding loop from using two inductors respectively placed on a hot line and a neutral line, and yet the same amount of inductance is still achieved. Also, because the number of coil winding loop is reduced, therefore the resistance from the wire is reduced and power loss is lessened.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A power protection device for being installed with wires connecting to a power, comprising:

a bar-shaped induction element;

a first coil winding, the first coil winding connecting to a first end of the bar-shaped induction element, and the first coil winding having a first terminal conduction end and a second terminal conduction end;

a second coil winding, the second coil winding connecting to a second end of the bar-shaped induction element and being opposite to the first coil winding connected to the first end of the bar-shaped induction element, and the second coil winding having a first terminal conduction end and a second terminal conduction end;

a first fuse, wherein a first end of the first fuse is connected to the first terminal conduction end of the first coil winding and a hot line of the wires;

a second fuse, wherein a first end of the second fuse is connected to the second terminal conduction end of the first coil winding and the hot line of the wires;

a first surge absorber, wherein a first end of the first surge absorber is connected to a second end of the first fuse, and a second end of the first surge absorber is connected to the first terminal conduction end of the second coil winding and a neutral line of the wires;

a second surge absorber, wherein a first end of the second surge absorber is connected to a second end of the second fuse, and a second end of the second surge absorber is connected to the second terminal conduction end of the second coil winding and the neutral line of the wires;

a third fuse, wherein a first end of the third fuse is connected to the neutral line of the wires;

a third surge absorber, wherein a first end of the third surge absorber is connected to a second end of the third fuse, and a second end of the third surge absorber is connected to the first terminal conduction end of the second coil winding and the neutral line of the wires;

a fourth surge absorber, wherein a first end of the fourth surge absorber is connected to the second end of the first fuse, and a second end of the fourth surge absorber is connected to the second end of the third fuse;

a fourth fuse, wherein a first end of the fourth fuse is connected to the neutral line of the wires;

a fifth surge absorber, wherein a first end of the fifth surge absorber is connected to a second end of the fourth fuse, and a second end of the fifth surge absorber is connected to the second terminal conduction end of the second coil winding and the neutral line of the wires; and a sixth surge absorber, wherein a first end of the sixth surge absorber is connected to the second end of the second fuse, and a second end of the sixth surge absorber is connected to the second end of the fourth fuse.

2. The power protection device according to claim 1, wherein the surge absorber is a metal oxide varistor (MOV).

3. The power protection device according to claim 1, wherein the surge absorber is a transient/surge absorber.

4. A surge protector, comprising:

a main body;

a power plug connecting to the main body;

at least a socket installed within the main body, every socket being electrically connected to the power plug; and a power protection device, installed within the main body and coupled between the power plug and the socket so as to prevent a power surge and to stabilize a current, wherein the power protection device comprises:

a bar-shaped element;

a first coil winding, the first coil winding connecting to a first end of the bar-shaped induction element, and the first coil winding having a first terminal conduction end and a second terminal conduction end;

a second coil winding, the second coil winding connecting to a second end of the bar-shaped induction element and being opposite to the first coil winding connecting to the first end of the bar-shaped induction element, and the second coil winding having a first terminal conduction end and a second terminal conduction end;

a first fuse, wherein a first end of the first fuse is connected to the first terminal conduction end of the first coil winding and a hot line of the wires;

a second fuse, wherein a first end of the second fuse is connected to the second terminal conduction end of the first coil winding and the hot line of the wires;

a first surge absorber, wherein a first end of the first surge absorber is connected to a second end of the first fuse, and a second end of the first surge absorber is connected to the first terminal conduction end of the second coil winding and a neutral line of the wires;

a second surge absorber, wherein a first end of the second surge absorber is connected to the other end of the second fuse, and a second end of the second surge absorber is connected to the second terminal conduction end of the second coil winding and the neutral line of the wires;

a third fuse, wherein a first end of the third fuse is connected to a neutral line of the wires;

a third surge absorber, wherein a first end of the third surge absorber is connected to a second end of the third fuse, and a second end of the third surge absorber is connected to the first terminal conduction end of the second coil winding and the neutral line of the wires;

a fourth surge absorber, wherein a first end of the fourth surge absorber is connected to the other end of the first fuse, and a second end of the fourth surge absorber is connected to a second end of the third fuse;

a fourth fuse, wherein a first end of the fourth fuse is connected to the neutral line of the wires;

a fifth surge absorber, wherein a first end of the fifth surge absorber is connected to the other end of the fourth fuse, and a second end of the fifth surge absorber is connected to the second terminal conduction end of the second coil winding and the neutral line of the wires; and a sixth surge absorber, wherein a first end of the sixth surge absorber is connected to a second end of the second fuse, and a second end of the sixth surge absorber is connected to a second end of the fourth fuse.

* * * * *